United States Patent
Nakagawa et al.

(10) Patent No.: US 12,344,705 B2
(45) Date of Patent: Jul. 1, 2025

(54) COPOLYMERIZED POLYESTER RESIN, MOLDED PRODUCT, AND HEAT-SHRINKABLE FILM

(71) Applicant: TOYOBO CO., LTD., Osaka (JP)

(72) Inventors: Satoru Nakagawa, Tsuruga (JP); Hideto Ohashi, Tsuruga (JP); Nobuyuki Hironaka, Tsuruga (JP); Hironao Sasaki, Osaka (JP); Kosuke Uotani, Tsuruga (JP); Keiichiro Togawa, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 661 days.

(21) Appl. No.: 17/276,477

(22) PCT Filed: Oct. 28, 2019

(86) PCT No.: PCT/JP2019/042138
§ 371 (c)(1),
(2) Date: Mar. 15, 2021

(87) PCT Pub. No.: WO2020/090720
PCT Pub. Date: May 7, 2020

(65) Prior Publication Data
US 2022/0041800 A1    Feb. 10, 2022

(30) Foreign Application Priority Data
Oct. 31, 2018 (JP) ................. 2018-205331

(51) Int. Cl.
C08G 63/183  (2006.01)
B29C 45/00   (2006.01)
C08J 5/18    (2006.01)
B29K 67/00   (2006.01)
B29L 7/00    (2006.01)

(52) U.S. Cl.
CPC ........ C08G 63/183 (2013.01); B29C 45/0001 (2013.01); C08J 5/18 (2013.01); B29K 2067/003 (2013.01); B29L 2007/002 (2013.01)

(58) Field of Classification Search
CPC ....... C08G 63/183; B29C 45/0001; C08J 5/18
See application file for complete search history.

(56) References Cited

U.S. PATENT DOCUMENTS

| | | | |
|---|---|---|---|
| 2007/0282056 A1* | 12/2007 | Schellekens | C08L 67/02 524/556 |
| 2016/0280851 A1* | 9/2016 | Uehira | C08J 5/18 |
| 2021/0108027 A1* | 4/2021 | Minami | C08G 63/183 |
| 2021/0371650 A1* | 12/2021 | Nunome | C08G 63/84 |

FOREIGN PATENT DOCUMENTS

| | | |
|---|---|---|
| EP | 3617247 A1 | 3/2020 |
| JP | H03-086522 A | 4/1991 |
| JP | H03-143619 A | 6/1991 |
| JP | H06256711 A * | 9/1994 |
| JP | H08-337659 A | 12/1996 |
| JP | 2000-109546 A | 4/2000 |
| JP | 2001-131267 A | 5/2001 |
| JP | 2004-027176 A | 1/2004 |
| JP | 2005213291 A * | 8/2005 |
| JP | 2007-070462 A | 3/2007 |
| JP | 2011-046859 A | 3/2011 |
| JP | 2011-046860 A | 3/2011 |
| JP | 2011-068879 A | 4/2011 |
| JP | 2011068880 A * | 4/2011 |
| JP | 4810744 B2 * | 11/2011 |
| WO | WO 2018/198845 A1 | 11/2018 |

OTHER PUBLICATIONS

JP2011068880A (trans.) (Year: 2011).*
JP 2005/213291 A (trans.) (Year: 2005).*
Ishii JP 4810744 B2 (JPO transl.) (Year: 2011).*
JP H06256711 A (JPO transl.) (Year: 1994).*
Japanese Patent Office, International Search Report in International Patent Application No. PCT/JP2019/042138 (Dec. 17, 2019).

* cited by examiner

Primary Examiner — Robert C Boyle
(74) Attorney, Agent, or Firm — Leydig, Voit & Mayer, Ltd.

(57) ABSTRACT

The invention provides a copolymerized polyester resin which contains terephthalic acid as a main component of a dicarboxylic acid component; and contains ethylene glycol as a main component of a diol component, wherein a content of neopentyl glycol is more than 15% by mole and not more than 40% by mole and a content of diethylene glycol is from 6 to 20% by mole when a total amount of the whole diol component is taken as 100% by mole, wherein a content of a cyclic dimer consisting of terephthalic acid, neopentyl glycol and diethylene glycol is 5000 ppm or less, and wherein a content of a cyclic trimer consisting of terephthalic acid and ethylene glycol is 5000 ppm or less.

12 Claims, No Drawings

COPOLYMERIZED POLYESTER RESIN, MOLDED PRODUCT, AND HEAT-SHRINKABLE FILM

CROSS-REFERENCE TO RELATED APPLICATIONS

This patent application is the U.S. national phase of International Patent Application No. PCT/JP2019/042138, filed on Oct. 28, 2019, which claims the benefit of Japanese Patent Application No. 2018-205331, filed on Oct. 31, 2018, which are incorporated by reference in their entireties herein.

TECHNICAL FIELD OF THE INVENTION

The present invention relates to a copolymerized polyester resin which is excellent in transparency, color tone, recycling property and moldability, and which exhibits less stain of film die head and less adhesion of foreign matter.

BACKGROUND ART

Polyester or, particularly, polyethylene terephthalate (PET) prepared from terephthalic acid (hereinafter, it is sometimes abbreviated as TPA) and ethylene glycol (hereinafter, it is sometimes abbreviated as EG) as starting materials is excellent in chemical and physical properties. Therefore, it has been widely used for container, film, sheet and fiber, etc.

Among the polyethylene terephthalate (PET), a polyester prepared by copolymerization of neopentyl glycol (hereinafter, it is sometimes abbreviated as NPG) during its preparation (hereinafter, it is sometimes abbreviated as copolymerized polyester) has recently received public attention due to its excellent transparency, shock resistance, moldability, thermal resistance, etc. Accordingly, it has been used in various uses or, particularly as a material polymer for molded product such as film, sheet, injection-molded product, profile-molded product, etc.

On the other hand, a vinyl chloride resin has been used as a molded product for outdoor use such as for building materials, in view of processability, environmental stability, price competitiveness, etc. However, there are risks of carcinogenesis and endocrine disruption due to elution of monomers and plasticizers from the molded product and also a problem of generation of toxic gas upon incineration. Accordingly, there has been an increasing demand for changing the vinyl chloride resin to the above polyester resin being copolymerized with NPG.

In order to improve the transparency, resistance to chemicals, moldability, etc., there have been proposed a copolymerized polyester wherein a copolymerization amount of neopentyl glycol is limited to a specific range, and a molded product prepared from the above copolymerized polyester (see Patent Documents 1 to 5). However, in a continuous production of film by the copolymerized polyester as such, there are a problem of coloration and decrease in molecular weight due to deterioration of the resin; a problem that foreign matter adheres near the die, etc. and then it is transferred to the film surface whereby a commercial value of the film is deteriorated; and also a problem at a time of recycling. Therefore, a means for solving these problems has been demanded. There has been also proposed a copolymerized polyester resin where a melt viscosity is increased by copolymerization with an agent for introducing a branched structure so as to improve extrusion moldability (see Patent Document 6).

PRIOR ART DOCUMENTS

Patent Documents

Patent Document 1: Japanese Patent Application Laid-Open (JP-A) No. 337659/96
Patent Document 2: Japanese Patent Application Laid-Open (JP-A) No. 2000-109546
Patent Document 3: Japanese Patent Application Laid-Open (JP-A) No. 2011-46859
Patent Document 4: Japanese Patent Application Laid-Open (JP-A) No. 2011-46860
Patent Document 5: Japanese Patent Application Laid-Open (JP-A) No. 2011-68879
Patent Document 6: Japanese Patent Application Laid-Open (JP-A) No. 2004-27176

DISCLOSURE OF THE INVENTION

Problem that the Invention is to Solve

The present invention has been created in view of the problems as such in the prior art. The objects of the present invention is to solve the problem of die staining and foreign matter adhesion to the film or molded product in the continuous production of the film or molded product; the problem of recycling property necessary for stability of the copolymerized polyester against heat and thermal oxidation; and the problem of coloration and molecular weight decrease of the resin upon recycling.

Means for Solving the Problem

With regard to the above objects, the inventors found that, when a content of a free cyclic dimer consisting of terephthalic acid, neopentyl glycol and diethylene glycol in a copolymerized polyester resin having a specific composition is 5000 ppm or less and when a content of a cyclic trimer consisting of terephthalic acid and ethylene glycol therein is 5000 ppm or less, it is now possible to provide a copolymerized polyester resin from which a molded product and film exhibiting high continuous productivity, high transparency and high commercial value can be advantageously prepared. It was further found that, when ethylene glycol, neopentyl glycol and diethylene glycol are jointly used, there is a tendency that crystallinity and polymer viscosity become low and that film-preparation property, molding property and transparency are improved. It was noted that, although diethylene glycol used in the copolymerized polyester is very excellent in terms of cost, its stability against heat and thermal oxidation is low. Then, the inventors thought that, as a result, stability of the copolymerized polyester against heat and thermal oxidation upon recycling of the film and molded product become low, and accordingly that the resin is deteriorated by heating upon film preparation and manufacture of the molded product whereby intrinsic viscosity and color of the film and the molded product greatly lower. The inventors then found that the stability of the copolymerized polyester resin against heat and thermal oxidation tends to be improved when a carboxyl end group concentration (AV) of the copolymerized polyester resin is within a range of 8 to 25 eq/t. Further, the inventors reached an idea of changing a type of catalyst used for polymerization of the copolymerized polyester resin in order to further enhance the stability against heat and thermal oxidation of the copolymerized polyester resin. And the inventors found that, when a combination (preferably, a combination of aluminum compound and phosphorus compound) is used instead of an antimony compound, titanium compound and germanium compound used as the polymerization catalyst, the stability of the resin against heat and thermal oxidation can be enhanced and, further, such combination is also excellent in terms of an activity as the polymerization catalyst. Accordingly, the inventors found that number-average molecular weight of the resulting molded product and film is not greatly lowered even if the number-average molecular weight of the resin is lowered for making the molding speed and film-preparation speed high and, as a result, that production cost of the molded product and film can be reduced without causing any problem in the moldability, film-preparation property and strength.

The present invention has been achieved on the basis of the above findings and has the constituent features of the following (1) to (9).

(1) A copolymerized polyester resin which contains terephthalic acid as a main component of a dicarboxylic acid component, contains ethylene glycol as a main component of a diol component, wherein a content of neopentyl glycol is more than 15% by mole and not more than 40% by mole and a content of diethylene glycol is from 6 to 20% by mole when a total amount of the whole diol component is taken as 100% by mole, wherein a content of a cyclic dimer consisting of terephthalic acid, neopentyl glycol and diethylene glycol is 5000 ppm or less, and wherein a content of a cyclic trimer consisting of terephthalic acid and ethylene glycol is 5000 ppm or less.

(2) The copolymerized polyester resin according to (1), wherein the content of cyclic trimer consisting of terephthalic acid and ethylene glycol is 4000 ppm or less.

(3) The copolymerized polyester resin according to (1) or (2), wherein the copolymerized polyester resin has a color b value of from −5.0 to 10.0.

(4) The copolymerized polyester resin according to any of (1) to (3), wherein the copolymerized polyester resin has a carboxyl end group concentration (AV) of from 8 to 25 eq/t, wherein the copolymerized polyester resin contains aluminum atom and phosphorus atom, wherein a content of the aluminum atom in the copolymerized polyester resin is 15 to 40 ppm and wherein a molar ratio of the phosphorus atom to the aluminum atom in the copolymerized polyester resin is 1.8 to 2.6.

(5) The copolymerized polyester resin according to any of (1) to (4), wherein, when a corrugated molded plate is prepared by molding the copolymerized polyester resin and a haze value is measured on an area of the corrugated molded plate having a thickness of 5 mm, the haze value is 15% or less.

(6) A molded product, characterized in that, it contains the copolymerized polyester resin mentioned in any of (1) to (5).

(7) A heat-shrinkable film, characterized in that, it contains the copolymerized polyester resin mentioned in any of (1) to (5).

Advantages of the Invention

According to the copolymerized polyester resin of the present invention, it is possible to suppress the stain of die and the adhesion of foreign matter to the film and molded product in the continuous production of the film and molded product, to achieve the recycling property necessary for the stability of the resin against heat and thermal oxidation, and to greatly lower the coloration of the resin upon recycling.

Also, the molded product or film prepared from the copolymerizable polyester resin of the present invention can exhibit the recycling property, the heat-resistance, and a beautiful appearance.

BEST MODE FOR CARRYING OUT THE INVENTION

Hereinafter, the copolymerized polyester resin of the present invention will be specifically illustrated.

The copolymerized polyester resin of the present invention is a polyester resin which contains a dicarboxylic acid component and a diol component as the constituting components. In the copolymerized polyester resin of the present invention, terephthalic acid is a main component of the dicarboxylic acid component, and ethylene glycol is a main component of the diol component, wherein a content of neopentyl glycol is more than 15% by mole and not more than 40% by mole and a content of diethylene glycol is from 6 to 20% by mole when a total amount of the whole diol component in total copolymerized polyester resin components is taken as 100% by mole. In the present invention, the main component of the diol component is ethylene glycol. This means that, in the diol component, ethylene glycol is most abundantly contained in terms of % by mole. The content of neopentyl glycol is preferred to be 18 to 38% by mole and more preferred to be 20 to 36% by mole. The content of diethylene glycol is preferred to be 7 to 19% by mole and more preferred to be 8 to 16% by mole.

In the present invention, the cyclic dimer consisting of terephthalic acid, neopentyl glycol and diethylene glycol as well as the cyclic trimer consisting of terephthalic acid and ethylene glycol stand for the following compounds. Thus, the former is a cyclic dimer wherein terephthalic acid, neopentyl glycol, terephthalic acid and diethylene glycol are bonded in this order in a cyclic manner (hereinafter, it will be abbreviated as T2N1D1) while the latter is a cyclic trimer wherein each three of terephthalic acid and ethylene glycol are alternately bonded in a cyclic manner (hereinafter, it will be abbreviated as CT). The feature of the present invention is that the content of T2N1D1 is 5000 ppm or less and that the content of CT is 5000 ppm or less. In the present invention, "copolymerized polyester resin" not only stands for a chemical substance which is a polyester but also stands for such a one which contains an oligomer component such as T2N1D1 and CT as well as the catalytic component which will be mentioned later. However, when a chemical substance being called a polyester is illustrated, "copolymerized polyester resin" may be used for the sake of convenience.

When the contents of neopentyl glycol and diethylene glycol are less than the above range, the resulting copolymerized polyester is crystalline and, accordingly, transparency of the molded product and the film becomes bad. As a result, there is a tendency that sufficient transparency cannot be achieved and commercial value cannot be achieved. Here, "amorphous" can be determined by the following method. A sample is allowed to stand in a Yamato DP63 drier at 120° C. for 120 minutes. Then, this sample is heated at a rate of 20° C./min from −100° C. to 300° C., then cooled at a rate of 50° C./min down to −100° C., and then heated at a rate of 20° C./min from −100° C. to 300° C., using a differential scanning calorimeter (DSC). When there is no melting peak in any of the two heating processes, the sample is judged as "amorphous". Since the copolymerized polyester resin of the present invention is amorphous, it can have sufficient transparency which allows the resin to be advantageously used even for a particularly thick molded product. In other words, the fact that the resin is judged as "amorphous" under this measuring condition means that the transparency of the film can be kept in high quality and further that a sufficient transparency can be maintained even if the resin is made into a thick film. Moreover, when the contents of neopentyl glycol and diethylene glycol are less than the above range, the content of CT also increases. Accordingly, an area near the resin outlet of die of a film-extrusion molding machine and a mold of an injection molding machine are very significantly stained in the continuous film preparation and molding whereby the adhered foreign matter is transferred to a surface of the film and molded product and the commercial value tends to lower. When the contents of neopentyl glycol and diethylene glycol exceeds the above range, the content of free T2N1D1 increases. Accordingly, an area near the resin outlet of die of a film-extrusion molding machine and a mold of an injection molding machine are very significantly stained in the continuous film preparation and molding whereby the adhered foreign matter is transferred to a surface of the film and molded product and the commercial value tends to lower. Although the mechanism of adhesion is unknown, it is likely to be as follows. Melting point and glass transition temperature are low due to the affection by diethylene glycol in T2N1D1. Accordingly, tackiness becomes high, and T2N1D1 becomes an adhesive whereby adhesion upon molding or to the die of a film-extrusion molding machine becomes big.

The content of T2N1D1 is preferred to be 4500 ppm or less and more preferred to be 4000 ppm or less. When the content of T2N1D1 exceeds 5000 ppm, the area near the resin outlet in the die of the extrusion molding machine upon film preparation is significantly stained whereby the adhered foreign matter is transferred to a surface of the film and molded product. As a result, surface condition becomes bad and the transparency is deteriorated whereby the commercial value is lowered. Moreover, when the molded product is continuously produced by the injection molding, an exhaust pipe of the mold for injection molding is clogged whereby normal molded product cannot be obtained. The lower limit of the content of T2N1D1 is 1000 ppm in view of economy upon the production. The content of T2N1D1 is the value quantified by a measuring method of Examples which will be mentioned later.

The content of CT is preferred to be 4500 ppm or less and more preferred to be 4000 ppm or less. When the content of CT exceeds 5000 ppm, the area near the resin outlet in the die of the extrusion molding machine upon film preparation is significantly stained whereby the adhered foreign matter is transferred to a surface of the film and molded product. As a result, surface condition becomes bad and the transparency is deteriorated whereby the commercial value is lowered. Moreover, when the molded product is continuously produced by the injection molding, an exhaust pipe of the mold for injection molding is clogged whereby normal molded product cannot be obtained. The lower limit of the content of CT is 1000 ppm in view of economy upon the production.

The main dicarboxylic acid component of the copolymerized polyester resin of the present invention is terephthalic acid. The ratio of terephthalic acid component to the total dicarboxylic acid components is preferred to be 70% by mole or more, more preferred to be 80% by mole or more, further preferred to be 90% by mole or more, and the most preferred to be 100% by mole.

As to other dicarboxylic acid components being able to be used together with terephthalic acid, there are exemplified (1) an aromatic dicarboxylic acid such as isophthalic acid, orthophthalic acid, 2,6-naphthalenedicarboxylic acid, diphenyl-4,4'-dicarboxylic acid and diphenoxyethane dicarboxylic acid and functional derivatives thereof, (2) an aliphatic dicarboxylic acid such as adipic acid, sebacic acid, succinic acid, glutaric acid, dimer acid, dodecanedicarboxylic acid and azelaic acid and functional derivatives thereof and (3) an alicyclic dicarboxylic acid such as hexahydroterephthalic acid, hexahydroisophthalic acid and cyclohexanedicarboxylic acid and functional derivatives thereof.

In the copolymerized polyester resin of the present invention, all of the diol components are constituted from ethylene glycol, neopentyl glycol and diethylene glycol. However, other diol component may also be used for imparting other functions or for improving the characteristic feature so far as various characteristics which are objects of the present invention are not disturbed thereby. The total amount of ethylene glycol, neopentyl glycol and diethylene glycol to the total diol components is preferred to be 70% by mole or more, further preferred to be 85% by mole or more, especially preferred to be 95% by mole or more, and the most preferred to be 100% by mole.

As to other diol components, there are exemplified (1) an aliphatic glycol such as trimethylene glycol, tetramethylene glycol, pentamethylene glycol and hexamethylene glycol, (2) an alicyclic glycol such as 1,3-cyclohexanedimethanol and 1,4-cyclohexanedimethanol and (3) an aromatic glycol such as p-xylylene glycol and m-xylylene glycol. Among them, 1,4-cyclohexanedimethanol is preferred. With regard to those diol components, any of them may be used solely or two or more of them may be used jointly in any ratio.

Preferably, the copolymerized polyester resin of the present invention contains a multifunctional compound having three or more carboxyl groups, hydroxyl groups or ester-forming groups thereof (such as trimellitic acid, pyromellitic acid, glycerol or trimethylolpropane) in an amount of 0.001 to 5% by mole to the acid component and/or the glycol component of the copolymerized ester resin, in view of enhancing the moldability upon profile extrusion.

The copolymerized polyester resin of the present invention can be prepared by any of a production method by direct esterification and polycondensation reaction and a production method by transesterification and polycondensation reaction. Those reactions may be conducted in a batch reactor or in a continuous reactor. In view of economy and quality stability, the continuous reactor is preferable.

In the continuous reactor (a continuous polycondensation method), each of esterification reaction, transesterification reaction and melt polycondensation reaction may be conducted in one step, but preferably it is conducted by dividing into plural steps. When the esterification reaction or the transesterification reaction is conducted by dividing into plural steps, a number of the reactors is preferred to be two or three. When the melt polycondensation reaction is conducted by dividing into plural steps, a number of the reactors is preferred to be three to seven.

When the copolymerized polyester resin of the present invention is produced by the continuous polycondensation method, a slurry containing 1.02 to 1.5 moles, preferably 1.03 to 1.4 moles of total glycols to 1 mole of total dicarboxylic acids or ester derivatives thereof is prepared. Then, the prepared slurry is continuously supplied to an esterification reaction step containing the oligomer. Temperature for the esterification reaction is usually 240 to 270° C. and preferably 250 to 265° C. Pressure in the reactor is usually 0.2 MPa or lower and preferably 0.01 to 0.05 MPa. Temperature for the polycondensation reaction is usually 265 to 285° C. and preferably 270 to 280° C. Pressure in the reactor is usually 1.5 hPa or lower and preferably 0.5 hPa or lower. Reaction time for the esterification reaction is preferred to be 5 hours or less and especially preferred to be 2 to 3.5 hours. Reaction time for the polycondensation reaction is preferred to be 3 hours or less and especially preferred to be 1 to 2 hour (s).

When the copolymerized polyester resin of the present invention is produced by the batch polycondensation method, temperature for the esterification reaction is usually 220 to 250° C. and preferably 230 to 245° C. Pressure in the reactor is usually 0.2 to 0.4 MPa and preferably 0.25 to 0.30 MPa. The polycondensation reaction may be conducted either in one step or by dividing into plural steps. When it is conducted in one step, pressure reduction and temperature rise are done gradually, and the final temperature is set to be 260 to 280° C., preferably 265 to 275° C., and the final pressure is usually set to be 3 hPa or less and preferably 0.5 hPa or less. Reaction time for the esterification reaction is preferred to be 4 hours or less and especially preferred to be 2 to 3 hours. Reaction time for the polycondensation reaction is preferred to be 5 hours or less and especially preferred to be 1 to 3 hour(s).

When a low polycondensate is produced by the continuous transesterification reaction, a solution containing dimethyl terephthalate and 1.1 to 1.6 moles, preferably 1.2 to 1.5 moles of glycol to 1 mole of dimethyl terephthalate is prepared. Then, the prepared solution is continuously supplied to the transesterification reaction step. Temperature for the transesterification reaction is usually 200 to 270° C. and preferably 230 to 265° C. In the case of the transesterification method, it is necessary to use a transesterification catalyst besides the polycondensation catalyst. The resulting low polycondensate is reacted in the same manner as in the case of the above continuous polycondensation.

When the low polycondensate is produced by the batch transesterification method, dimethyl terephthalate and 2.3 to 2.0 moles, preferably 2.2 to 2.0 moles of glycol to 1 mole of dimethyl terephthalate are added to a batch reactor and the reaction is conducted in the presence of the transesterification catalyst. The resulting low polycondensate is subjected to a polycondensation in the same manner as in the case of the above esterification reaction.

With regard to the polycondensation catalyst, at least one of antimony compound, germanium compound, titanium compound and aluminum compound can be used. As to the antimony compound, there are exemplified antimony trioxide, antimony pentoxide, antimony acetate and antimony glycoxide. Among them, antimony trioxide, antimony acetate and antimony glycoxide are preferred, and antimony trioxide is especially preferred. Content of the antimony compound is preferred to be 50 to 400 ppm to the produced copolymerized polyester resin. It is further preferred to be 100 to 350 ppm and especially preferred to be 150 to 300 ppm.

As to the germanium compound, there are exemplified crystalline germanium dioxide, non-crystalline germanium dioxide, germanium tetraoxide, germanium hydroxide, germanium oxalate, germanium chloride, germanium tetraethoxide, germanium tetra-n-butoxide and germanium phosphite. Among them, crystalline germanium dioxide and non-crystalline germanium dioxide are further preferred, and non-crystalline germanium dioxide is especially preferred. Content of the germanium compound is preferred to be 10 to 100 ppm to the produced copolymerized polyester resin. It is further preferred to be 30 to 70 ppm and especially preferred to be 30 to 50 ppm.

As to the titanium compound, there are exemplified tetraalkyl titanate (such as tetraethyl titanate, tetraisopropyl titanate, tetra-n-propyl titanate and tetra-n-butyl titanate) as well as partially hydrolyzed compound thereof, titanium acetate, a titanyl oxalate compound (such as titanyl oxalate, ammonium titanyl oxalate, sodium titanyl oxalate, potassium titanyl oxalate, calcium titanyl oxalate and strontium titanyl oxalate), titanium trimellitate, titanium sulfate, titanium chloride, a hydrolyzed product of titanium halide, titanium bromide, titanium fluoride, potassium hexafluroti-tanate, ammonium hexafluorotitanate, cobalt hexafluoroti-tanate, manganese hexafluorotitanate, titanium acetylaceto-nate, a titanium complex with hydroxyl polyvalent carboxylic acid or nitrogen-containing polyvalent carboxylic acid, a composite oxide comprising titanium and silicon or zirconium and a reaction product of titanium alkoxide with phosphorus compound. Among them, titanium tetraiso-propoxide, titanium tetrabutoxide and titanium potassium oxalate are preferred, and titanium tetrabutoxide is especially preferred. Content of the titanium compound is preferred to be 1 to 50 ppm to the produced copolymerized polyester resin. It is further preferred to be 2 to 20 ppm and especially preferred to be 3 to 10 ppm.

As to the polycondensation catalyst, an aluminum compound is preferred in view of the recycling property (stability against heat and thermal oxidation). The aluminum compound is preferred to be used together with a phosphorus compound. As to the aluminum compound constituting the polymerization catalyst used in the production of the copolymerized polyester resin of the present invention, known aluminum compound can be used without limitation.

As to the aluminum compound, there are specifically exemplified aluminum acetate, basic aluminum acetate, aluminum lactate, aluminum chloride, aluminum hydroxide and aluminum hydroxide chloride and an organoaluminum compound such as aluminum acetylacetonate and aluminum oxalate as well as partially hydrolyzed products thereof. Among the above, preferred ones are carboxylate, inorganic acid salt and chelate compound and, among them, more preferred ones are aluminum acetate, basic aluminum acetate, aluminum lactate, aluminum chloride, aluminum hydroxide, aluminum hydroxide chloride and aluminum acetylacetonate. Further preferred ones are aluminum acetate, basic aluminum acetate, aluminum chloride, aluminum hydroxide, and aluminum hydroxide chloride. The most preferred ones are aluminum acetate and basic aluminum acetate.

As to the amount of the aluminum compound used as the polymerization catalyst, it is preferred that 15 to 40 ppm remains as an aluminum atom to the total mass of the resulting polyester resin. More preferably, 17 to 38 ppm remains and further preferably, 20 to 35 ppm remains. When the remaining amount of the aluminum atom is less than the above range, the catalytic activity may not be sufficiently achieved. On the contrary, when the remaining amount of aluminum atom exceeds the above range, the stability against heat and thermal oxidation may be lowered, or foreign matters caused by aluminum may be generated, or a coloration may be increased. As explained above, with regard to the aluminum compound, nearly 100% of its amount used as the polymerization catalyst remains even when the system is placed under an environment of reduced pressure upon polymerization of the polyester resin. Therefore, as to the aluminum atom, it is possible to consider that the amount used as the polymerization catalyst is equal to the residual amount in the resin.

There is no particular limitation for the phosphorus compound used as the polymerization catalyst. However, a compound of phosphonic acid type or that of phosphinic acid type is preferable because they greatly enhance the catalytic activity. Among them, a compound of a phosphonic acid type is more preferable because it particularly greatly enhances the catalytic activity.

Preferably, the phosphorus compound has a phenol moiety in the same molecule. Such phosphorus compound greatly enhances the stability of the resin against heat and thermal oxidation. There is no particular limitation therefor so far as it is a phosphorus compound having a phenol structure. However, one or more type(s) of compound(s) selected from a group consisting of a phosphonic acid-type compound and a phosphinic acid-type compound having a phenol moiety in the same molecule are preferable because they greatly enhance both of the catalytic activity and the stability of the resin against heat and thermal oxidation. Among them, one or more type(s) of a phosphonic acid-type compound having a phenol moiety in the same molecule are more preferable because they particularly greatly enhance both of the catalytic activity and the stability of the resin against heat and thermal oxidation.

As to the phosphorus compound having a phenol moiety in the same molecule, there are exemplified the compounds represented by the following general formulae (1) and (2).

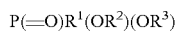
general formula (1)

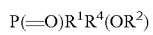
general formula (2)

(In the general formulae (1) and (2), $R^1$ is a phenol moiety-containing $C_{1-50}$ hydrocarbon group, or a $C_{1-50}$ hydrocarbon group which contains a substituent such as hydroxyl group or halogen group or alkoxy group or amino group and a phenol moiety. $R^4$ is hydrogen, or is a $C_{1-50}$ hydrocarbon group, or is a $C_{1-50}$ hydrocarbon group which contains a substituent such as hydroxyl group or halogen group or alkoxy group or amino group. $R^2$ and $R^3$ each independently is hydrogen, or is a $C_{1-50}$ hydrocarbon group or is a $C_{1-50}$ hydrocarbon group which contains a substituent such as hydroxyl group and alkoxy group. The hydrocarbon group may also contain a branched structure, an alicyclic structure such as cyclohexyl or an aromatic ring structure such as phenyl and naphthyl. Terminals of $R^2$ and $R^4$ may also be bonded each other.

As to the phosphorus compound having a phenol moiety in the same molecule, there are exemplified p-hydroxyphenylphosphonic acid, dimethyl p-hydroxyphenylphosphonate, diethyl p-hydroxyphenylphosphonate, diphenyl p-hydroxyphenylphosphonate, bis(p-hydroxyphenyl) phosphinic acid, methyl bis(p-hydroxyphenyl) phosphinate, phenyl bis-(p-hydroxyphenyl) phosphinate, p-hydroxyphenyl phenylphosphinic acid, methyl (p-hydroxyphenyl) phenylphosphinate, phenyl (p-hydroxyphenyl) phenylphosphinate, p-hydroxyphenyl phosphinic acid, methyl p-hydroxyphenyl phosphinate and phenyl p-hydroxyphenyl phosphinate. Besides the above, a phosphorus compound represented by the following general formula (3) is also exemplified.

general formula (3)

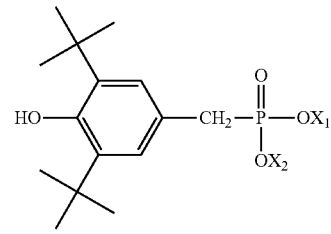

In the general formula (3), $X_1$ and $X_2$ each is hydrogen, an alkyl group having 1 to 4 carbon(s) or a metal of mono- or higher valent.

When $X_1$ is a metal of di- or higher valent, $X_2$ may be absent. Furthermore, an anion corresponding to excessive valence number of the metal may also be arranged to the phosphorus compound.

Preferable metal is Li, Na, K, Ca, Mg or Al.

When the phosphorus compound as such having a phenol moiety in the same molecule is added during the polymerization of the polyester, the catalytic activity of the aluminum compound is enhanced. In addition, the stability of the polyester resin against heat and thermal oxidation is enhanced. The reason therefor is likely to be that a hindered phenol moiety in the phosphorus compound enhances the stability of the polyester resin against heat and thermal oxidation. When the residual amount of the phosphorus compound is 31 ppm or less, the above effect of enhancing the stability against heat and thermal oxidation is reduced. As a result, the enhancing effect of the stability of the polyester resin against heat and thermal oxidation and the enhancing effect for colorization of the present invention may not be achieved.

Among the above, a phosphorus compound which is preferred to be used as the polycondensation catalyst is at least one phosphorus compound selected from the compounds represented by the following formulae (4) and (5).

formula (4)

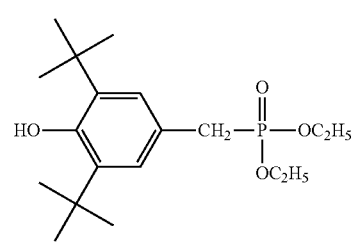

formula (5)

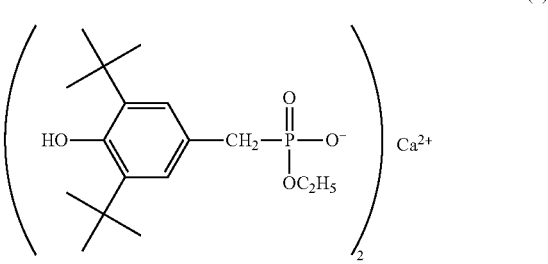

As to the compound represented by the above formula (4), Irganox 1222 (manufactured by BASF) is commercially available. Further, as to the compound represented by the formula (5), Irganox 1425 (manufactured by BASF) is commercially available.

As to the amount of the phosphorus compound used as the polymerization catalyst, it is preferred that 31 to 119 ppm in terms of phosphorus atom remains to the total mass of the resulting copolymerized polyester resin. It is more preferably 39 to 105 ppm remains and further preferably 48 to 92 ppm remains. When the phosphorus atom being outside the above upper and lower limits remains, the polymerization activity may be lowered. As explained above, with regard to the phosphorus compound, a part of the amount firstly added to a system as the polymerization catalyst is removed to an outside of the system when the system is placed under an environment of reduced pressure upon polymerization of the polyester resin. However, this removal rate is almost constant. Considering the removal rate, it can be said that there is no problem even if the amount of the phosphorus atom is defined by the residual amount instead of the amount used as the polymerization catalyst.

Further, as mentioned above, the ratio of the phosphorus compound to the aluminum compound is also important in the present invention. To be more specific, in the present invention, it is preferred that the molar ratio of the phosphorus atom to the aluminum atom (ratio of P/Al) in the polyester resin is 1.8 to 2.6. More preferably, it is 2.0 to 2.4 and further preferably, it is 2.1 to 2.3. When the aluminum compound is solely used as the polymerization catalyst, its catalytic activity cannot be sufficiently exhibited. On the contrary, when the phosphorus compound is used together with the aluminum compound as the polymerization catalyst in a specific ratio, it is now possible to sufficiently enhance the catalytic activity. When the molar ratio of the phosphorus atom to the aluminum atom in the polyester resin is out of the above range, the function as the polymerization catalyst may not be sufficiently achieved.

In the present invention, a metal-containing polycondensation catalyst such as a titanium compound, a tin compound and a germanium compound may also be used in addition to the above aluminum compound and phosphorus compound so as to further enhance the catalytic activity within such an extent that the effect of the present invention is not deteriorated thereby. In that case, an amount of the germanium compound is preferred to be 10 ppm or less in terms of germanium atom to the mass of the resulting polyester resin. An amount of the titanium compound is preferred to be 3 ppm or less in terms of titanium atom to the mass of the resulting polyester resin. An amount of the tin compound is preferred to be 3 ppm or less in terms of tin atom to the mass of the resulting polyester resin. However, in view of the object of the present invention, it is preferable that those metal-containing polycondensation catalysts such as titanium compound, tin compound and germanium compound are not used as much as possible. In addition, an antimony compound which is commonly used as the polymerization catalyst is inferior in the enhancing effect for the stability of the resin against heat and thermal oxidation as mentioned above. Accordingly, the antimony compound should not be used in the present invention.

Further, in the production of a copolymerized polyester resin of the present invention, an alkali metal compound or an alkali earth metal compound may also be jointly used. As to the alkali metal compound or the alkali earth metal compound, there are exemplified a carboxylate (such as an acetate) or an alkoxide of the element. It is added to the reaction system in a form of powder, aqueous solution, ethylene glycol solution, etc.

In the case of the direct esterification method, the polycondensation catalyst may be added before the initiation of the esterification reaction or at any time between after the completion of pressurized esterification reaction and before the start of the initial polycondensation reaction. However, when the antimony compound or the titanium compound is used as the polycondensation catalyst, it is preferred to add such compound before the esterification reaction. Preferably, other polycondensation catalyst, heat-stabilizer and additive are added after the esterification reaction.

In the case of the transesterification method, the polycondensation catalyst may be added at any time between before the start of transesterification reaction and before the start of the initial polycondensation reaction. However, since the titanium compound has a function of not only as the polycondensation catalyst but also as a transesterification catalyst, it is preferred to add the titanium compound before initiation of the transesterification reaction. Preferably, other polycondensation catalyst, heat-stabilizer and additive are added after completion of the transesterification reaction. As to the transesterification catalyst, manganese acetate, magnesium acetate, a titanium compound such as titanium tetrabutoxide, etc. are suitable. The transesterification catalyst needs to be added before initiation of the transesterification reaction.

When a catalyst other than the above aluminum compound is used, a phosphorus compound may be used as a stabilizer. As to the phosphorus compound, there may be exemplified phosphoric acid, phosphorous acid, phosphonic acid and derivatives thereof. As to suitable specific examples thereof, there may be listed phosphoric acid, trimethyl phosphate, tributyl phosphate, triphenyl phosphate, monomethyl phosphate, dimethyl phosphate, monobutyl phosphate, dibutyl phosphate, phosphorous acid, trimethyl phosphite, tributyl phosphite, methylphosphonic acid, dimethyl methylphosphonate, dimethyl ethylphosphonate, dimethyl phenylphosphonate, diethyl phenylphosphonate and diphenyl phenylphosphonate. Among them, trimethyl phosphate and phosphoric acid are especially preferred. A content of the phosphorus compound is preferred to be 1 to 100 ppm to the produced copolymerized polyester resin. It is further preferred to be 3 to 70 ppm and especially preferred to be 5 to 50 ppm.

For improving the color tone of the copolymerized polyester resin, a cobalt compound may be compounded therewith. As a result of addition of such cobalt compound, the color b value can be particularly made small. A content of the cobalt compound in terms of the cobalt atom is preferably 0.5 to 30 ppm, more preferably 1 to 20 ppm, and especially preferably 1 to 15 ppm to the copolymerized polyester resin. When the content of cobalt atom exceeds the above range, the copolymerized polyester resin darkens or becomes strongly bluish as a result of reduction of cobalt metal. To be more specific, the color L value becomes less than 50 or the color b value becomes less than −5 whereby the commercial value lowers. As to the cobalt compound, there are exemplified cobalt acetate, cobalt chloride, cobalt benzoate and cobalt chromate. Among them, cobalt acetate is preferred.

The copolymerized polyester resin prepared by the above continuous polycondensation method or batch polycondensation method is usually drawn out in a strand shape from a drawing-out hole formed at a bottom of the reactor and cut into chips or sheets after being cooled with water.

The copolymerized polyester resin according to the present invention which contains small amount of free T2N1D1 and CT can be prepared by additionally adding the specific diol component during the esterification reaction or the transesterification reaction or after the reaction, and then conducting the polycondensation reaction. The specific diol component is preferred to be neopentyl glycol or diethylene glycol and more preferred to be neopentyl glycol.

For example, a material monomer in such an amount wherein the additionally added amount is taken into consideration is firstly subjected to the esterification reaction or the transesterification reaction. During the reaction, diethylene glycol is added. Then, after the reaction, neopentyl glycol and diethylene glycol are additionally added, and the mixture is stirred for more than 5 minutes. After the stirring, the polycondensation is conducted. The additionally added diol component is preferred to be 1 to 10% by mole of the total diol components.

Alternatively, a material monomer in such an amount wherein the additionally added amount is taken into consideration is firstly subjected to the esterification reaction or the transesterification reaction. During the reaction, neopentyl glycol and diethylene glycol are added. Then, after the reaction, neopentyl glycol is additionally added, and the mixture is stirred for more than 5 minutes. After the stirring, the polycondensation is conducted. The additionally added diol component is preferred to be 1 to 10% by mole of the total diol components.

Alternatively, a material monomer in such an amount wherein the additionally added amount is taken into consideration is firstly subjected to the esterification reaction or the transesterification reaction. During the reaction, diethylene glycol is added. Then, after the reaction, neopentyl glycol is additionally added, and the mixture is stirred for more than 5 minutes. After the stirring, the polycondensation is conducted. The additionally added diol component is preferred to be 1 to 10% by mole of the total diol components.

The mechanism is presumed as follows. When the specific diol component is additionally added and stirred during the esterification reaction or the transesterification reaction or after the reaction, the cyclic T2N1D1 and CT which have been already produced by the esterification reaction or the transesterification reaction are ring-opened during the polycondensation reaction. As a result, the contents of T2N1D1 and CT are decreased.

The above-prepared copolymerized polyester resin is preferred to have a carboxyl end group concentration of 8 to 25 equivalents per one ton of the polymer. More preferably, the carboxyl end group concentration is 23 equivalents or less per one ton of the polymer. When the carboxyl end group concentration is within the above range, it is possible to suppress the coloration of the copolymerized polyester resin.

A number-average molecular weight of the copolymerized polyester resin of the present invention is preferred to be 15000 to 30000, more preferred to be 17000 to 28000, and further preferred to be 18000 to 27000. When the number-average molecular weight is less than the above range, crystallinity may rise and haze may become high. Further, the molded product may lack strength and elongation due to insufficient cohesive force of the resin and the product may become brittle whereby it cannot be used. On the contrary, when the number-average molecular weight exceeds the above range, the melt viscosity may become too high whereby the optimum temperature for various molding processes may also rise and the heat stability may become bad and the sheet-preparation property may lower. In addition, the T2N1D1 and CT may increase and, as a result, transparency of the molded product may be deteriorated.

A glass transition temperature of the copolymerized polyester resin of the present invention is preferred to be 40° C. or higher and lower than 120° C. It is more preferred to be 45° C. or higher and lower than 115° C., and the most preferred to be 50° C. or higher and lower than 110° C. The glass transition temperature mentioned here stands for a value measured by using a differential scanning calorimeter (DSC) at a temperature rise of 20° C./min. When the glass transition temperature is less than the above range, the film and the molded product by profile extrusion may be heat-distorted in case they are used outdoors in summertime or in case they are transported or stored in a storehouse in a tightly-closed condition in summertime.

A color b value of the copolymerized polyester resin of the present invention is preferred to be −5.0 to 10.0. The lower limit is more preferred to be −3.0, and further preferred to be −2.5. When the color b value exceeds the upper limit value, yellowish color of the copolymerized polyester resin becomes strong and is not favorable in view of the color tone. On the other hand, when the color b value is large in the direction of negative from −5.0, the blueish color of the copolymerized polyester resin becomes significant and the product cannot be used in some applications.

When the copolymerized polyester resin of the present invention is molded into a corrugated molded plate at a mold temperature of 100° C., the haze value measured on an area of the corrugated molded plate having a thickness of 5 mm is preferred to be 15% or less. It is further preferred to be 13% or less and especially preferred to be 10% or less. When the haze value exceeds the above value, transparency of the molded product or the film may be deteriorated and the product cannot be used in the applications which require severe level of transparency.

In the copolymerized polyester resin of the present invention, other ingredients may also be appropriately added thereto depending upon the applications. For example, shock resistance enhancer, filler, ultraviolet absorber, surface finisher, lubricant, light stabilizer, pigment, antistatic agent, antibacterial agent, crosslinking agent, sulfur-type antioxidant, flame retardant, plasticizer, processing aid, foaming agent, etc. may be added. The copolymerized polyester resin of the present invention is advantageously molded into various molded products by means of extrusion blow molding, draw molding, injection molding, profile extrusion molding, calendar processing molding, etc. which have been commonly used in PET and polyvinyl chloride.

EXAMPLES

Hereunder, the present invention will be more specifically illustrated by Examples although the present invention shall not be limited thereto. The characteristic features of the copolymerized polyester resin were measured by the following methods.

1) Number-Average Molecular Weight

Number-average molecular weight was measured by Waters gel permeation chromatography using tetrahydrofuran as a solvent and polystyrene as a calibration reference. The measured value converted in terms of polystyrene was obtained using chloroform as an eluting solution.

2) Intrinsic Viscosity (IV) of the Copolymerized Polyester Resin

A sample (0.1 g) being dried at 60° C. for 24 hours was precisely weighed and dissolved in a mixed solvent of 25 mL of phenol/tetrachloroethane (in a ratio of 3/2 by mass). Its intrinsic viscosity was measured at 30° C. using an Ostwald viscometer.

3) Content of T2N1D1

A copolymerized polyester resin (50 mg) was dissolved in 1 mL of a mixed liquid of hexafluoroisopropanol/chloroform (ratio by volume=1/9) followed by further diluting by addition of 4 mL of chloroform. Then, 10 mL of methanol was added thereto so as to precipitate the polymer. After that, centrifugal separation was conducted. A supernatant liquid after the centrifugal separation was concentrated and evaporated to dryness followed by re-dissolving in 0.4 mL of dimethylformamide so as to prepare a solution. This solution was used to determine the content of T2N1D1 by high-performance liquid chromatography.

Apparatus: Waters ACQUITY UPLC
Column: Waters BEH-C18 2.1×150 mm (manufactured by Waters)

4) Content of CT

Content of CT was measured by high-performance liquid chromatography in the same method as for the above measurement of the T2N1D1 content.

5) Composition Ratio of the Copolymerized Polyester Resin

A sample of the copolymerized polyester resin (about 5 mg) was dissolved in 0.7 ml of a mixed solution of chloroform-d and trifluoroacetic acid (ratio by volume: 9/1). Composition ratio was determined using $^1$H-NMR (UNITY 50 manufactured by Varian).

6) Color Tone

Color of chips of the copolymerized polyester resin was measured using a colorimeter (ZE-6000 manufactured by Nippon Denshoku) so as to determine the color b value.

7) Haze Value

The copolymerized polyester resin was melted at 280° C. using an injection molding device (M-150C-DM manufactured by Meiki Seisakusho) and molded into a corrugated molded plate having a thickness of 2 to 11 mm at a mold temperature of 10° C. Haze value (%) was measured on an area of the corrugated molded plate having a thickness of 5 mm by a haze-meter (Model NDH2000 manufactured by Nippon Denshoku).

8) Moldability Test (Evaluation of Sheet-Preparation Property)

A dried copolymerized polyester resin sample was placed into an extruder equipped with die for sheet, and sheets of about 0.5 mm thickness were continuously molded for two days. A state of adhesion of staining material on the die outlet and a state of the sheet surface were evaluated by naked eyes according to the following criteria.

(Evaluation Criteria)

- ⊚: Almost no staining material was adhered on the die outlet and the surface state of the sheet was good.
- ○: Although the staining material was very slightly adhered on the die outlet, the surface state of the sheet was good.
- Δ: The staining material was slightly adhered on the die outlet and foreign matter was slightly adhered on the sheet surface.
- x: The staining material was significantly adhered on the die outlet and the foreign matter was significantly adhered on the sheet surface.

9) DSC Measurement of the Copolymerized Polyester Resin

A sample was allowed to stand in a Yamato DP63 drier at 120° C. for 120 minutes. Then, this sample was heated at a rate of 20° C./min from −100° C. to 300° C., then cooled at a rate of 50° C./min down to −100° C., and then heated at a rate of 20° C./min from −100° C. to 300° C., using a differential scanning calorimeter (DSC). It was checked whether there were melting peaks during the two heating processes. When there was no melting peak in any of the two heating processes, the sample was judged as "○". When there was a melting peak in at least one of the processes, the sample was judged as "x".

10) Evaluation of Thermal Stability: Parameter of Thermal Oxidative Decomposition (TD)

Dried chips (3 g) of the copolymerized polyester resin were placed in a test tube made of glass, and melted by being immersed in an oil bath of 280° C. for 120 minutes under a nitrogen atmosphere. TD was determined according to the following formulae.

$[IV]_{f1}$ after heating was measured. TD was determined as follows. Here, $[IV]_i$ and $[IV]_{f1}$ stand for IV (dL/g) before and after the heating test, respectively.

$$TD=0.245\{[IV]_{f1}^{-1.47}-[IV]_i^{-1.47}\}$$

The smaller the value of the parameter of thermal oxidative decomposition (TD) of the copolymerized polyester, the higher the thermal stability.

Example 1

A slurry containing high purity terephthalic acid (TPA) as a dicarboxylic acid component and ethylene glycol (EG) and neopentyl glycol (NPG) as glycol components was prepared with a molar ratio (G/A) of the total glycol components to the dicarboxylic component of 2.2. This slurry was continuously supplied to a first esterification reactor wherein a reacting product remains. After that, an esterification reaction was conducted with stirring under a condition wherein the pressure in the reactor was 0.15 MPa and the temperature was 257° C. so as to make the average retention time 3 hours. The resulting reaction product was transferred to a second esterification reactor, and an esterification reaction was conducted with stirring under a condition wherein the pressure in the reactor was 0.05 MPa and the temperature was 257° C. so as to make the average retention time 1 hour. The resulting esterification reaction product was transferred to a third esterification reactor, and an esterification reaction was conducted with stirring under a condition wherein the pressure in the reactor was 0.05 MPa and the temperature was 257° C.

To the resulting oligomer, neopentyl glycol in an amount corresponding to 20% of the amount which was added before the esterification reaction and diethylene glycol in an amount which corresponds to the aimed composition were added and then the reaction was conducted for about 15 minute or longer.

Then, predetermined amounts of a solution of an aluminum compound (basic aluminum acetate) in ethylene glycol and a solution of a phosphorus compound (Irganox 1222: a compound of the above-mentioned chemical formula (4)) in ethylene glycol were added to this esterification reaction product. The resulting mixture was continuously supplied to the first polycondensation reactor, and a polycondensation reaction was conducted with stirring at 261° C. and 6.7 kPa for 1 hour; then, at 272° C. and 0.6 kPa for 1 hour with stirring in the second polycondensation reactor; and then, at 275° C. and 0.10 to 0.20 kPa for 1 hour with stirring in the final polycondensation reactor. After the polycondensation reaction, the reaction product was passed through a polymer filter, and the copolymerized polyester resin in a melted state was pulled out in a strand form from a nozzle of a die, cooled with water in a cooling bath, and cut into chips. The number-average molecular weight of the resulting copolymerized polyester resin was 19,000.

Result of the evaluations is shown in Table 1. The copolymerized polyester resin obtained in this Example was evaluated in view of sheet moldability by the method mentioned in 8). The moldability was good.

Examples 2 to 5

Copolymerized polyester resins were obtained in the same manner as in Example 1. Result of the evaluations is shown in Table 1. The copolymerized polyester resins obtained in these Examples were evaluated in view of sheet moldability by the method mentioned in 8). The moldability was good.

Example 6

A slurry containing highly pure terephthalic acid (TPA) as a dicarboxylic acid component and ethylene glycol (EG) and neopentyl glycol (NPG) as glycol components was prepared with a molar ratio (G/A) of the total glycol components to the dicarboxylic component of 1.6. This slurry was continuously supplied to a first esterification reactor wherein the reacting substances previously remain. After that, an esterification reaction was conducted with stirring under a condition wherein the pressure in the reactor was 0.15 MPa and the temperature was 257° C. so as to make the average retention time 3 hours. The resulting reaction product was transferred to a second esterification reactor, and an esterification reaction was conducted with stirring under a condition wherein the pressure in the reactor was 0.05 MPa and the temperature was 257° C. so as to make the average retention time 1 hour. The resulting esterification reaction product was transferred to a third esterification reactor, and an esterification reaction was conducted with stirring under a condition wherein the pressure in the reactor was 0.05 MPa and the temperature was 257° C.

To the resulting oligomer, neopentyl glycol in an amount corresponding to 20% of the amount which was added before the esterification reaction and diethylene glycol in an amount which corresponds to the aimed composition were added and then the reaction was conducted for about 15 minute or longer.

Then, predetermined amounts of a solution of an aluminum compound (basic aluminum acetate) in ethylene glycol and a solution of a phosphorus compound (Irganox 1222: a compound of the above-mentioned chemical formula (4)) in ethylene glycol were added to this esterification reaction product. The resulting mixture was continuously supplied to the first polycondensation reactor, and a polycondensation reaction was conducted with stirring at 261° C. and 6.7 kPa for 1 hour; then, at 272° C. and 0.6 kPa for 1 hour with stirring in the second polycondensation reactor; and then, at 275° C. and 0.10 to 0.20 kPa for 1 hour with stirring in the final polycondensation reactor. After the polycondensation reaction, the reaction product was passed through a polymer filter, and the copolymerized polyester resin in a melted state was pulled out in a strand form from a nozzle of a die, cooled with water in a cooling bath, and cut into chips. The number-average molecular weight of the resulting copolymerized polyester resin was 20,000. The carboxyl end group concentration of the resulting copolymerized polyester resin was 24 eq/t. Result of the evaluations is shown in Table 1. The copolymerized polyester resin obtained in this Example was evaluated in view of sheet moldability by the method mentioned in 8). The moldability was good. The resin color was 4.5, and the evaluation of thermal stability was 0.11. Therefore, the resin color and the evaluation of thermal stability were slightly lowered.

Example 7

A slurry containing highly pure terephthalic acid (TPA) as a dicarboxylic acid component and ethylene glycol (EG) and neopentyl glycol (NPG) as glycol components was prepared with a molar ratio (G/A) of the total glycol components to the dicarboxylic component of 2.2. This slurry was continuously supplied to a first esterification reactor wherein the reacting substances previously remain. After that, an esterification reaction was conducted with stirring under a condition wherein the pressure in the reactor was 0.15 MPa and the temperature was 257° C. so as to make the average retention time 3 hours. The resulting reaction product was transferred to a second esterification reactor, and an esterification reaction was conducted with stirring under a condition wherein the pressure in the reactor was 0.05 MPa and the temperature was 257° C. so as to make the average retention time 1 hour. The resulting esterification reaction product was transferred to a third esterification reactor, and an esterification reaction was conducted with stirring under a condition wherein the pressure in the reactor was 0.05 MPa and the temperature was 257° C.

To the resulting oligomer, neopentyl glycol in an amount corresponding to 20% of the amount which was added before the esterification reaction and diethylene glycol in an amount which corresponds to the aimed composition were added and then the reaction was conducted for about 15 minute or longer.

Then, predetermined amounts of a solution of an aluminum compound (basic aluminum acetate) in ethylene glycol and a solution of a phosphorus compound (Irganox 1222: a compound of the above-mentioned chemical formula (4)) in ethylene glycol were added to this esterification reaction product. The resulting mixture was continuously supplied to the first polycondensation reactor, and a polycondensation reaction was conducted with stirring at 261° C. and 6.7 kPa for 1 hour; then, at 272° C. and 0.6 kPa for 1 hour with stirring in the second polycondensation reactor; and then, at 275° C. and 0.10 to 0.20 kPa for 0.9 hour with stirring in the final polycondensation reactor. After the polycondensation reaction, the reaction product was passed through a polymer filter, and the copolymerized polyester resin in a melted state was pulled out in a strand form from a nozzle of a die, cooled with water in a cooling bath, and cut into chips. The number-average molecular weight of the resulting copolymerized polyester resin was 16,000. Result of the evaluations is shown in Table 1. The copolymerized polyester resin obtained in this Example was evaluated in view of sheet moldability by the method mentioned in 8). The moldability was good. The haze of the corrugated molded plate was 12.0. Therefore, the haze was slightly lowered.

Example 8

A slurry containing highly pure terephthalic acid (TPA) as a dicarboxylic acid component and ethylene glycol (EG) and neopentyl glycol (NPG) as glycol components was prepared with a molar ratio (G/A) of the total glycol components to the dicarboxylic component of 2.2. This slurry was continuously supplied to a first esterification reactor wherein the reacting substances previously remain. After that, an esterification reaction was conducted with stirring under a condition wherein the pressure in the reactor was 0.15 MPa and the temperature was 257° C. so as to make the average retention time 3 hours. The resulting reaction product was transferred to a second esterification reactor, and an esterification reaction was conducted with stirring under a condition wherein the pressure in the reactor was 0.05 MPa and the temperature was 257° C. so as to make the average retention time 1 hour. The resulting esterification reaction product was transferred to a third esterification reactor, and an esterification reaction was conducted with stirring under a condition wherein the pressure in the reactor was 0.05 MPa and the temperature was 257° C.

To the resulting oligomer, neopentyl glycol in an amount corresponding to 20% of the amount which was added before the esterification reaction and diethylene glycol in an amount which corresponds to the aimed composition were added and then the reaction was conducted for about 15 minute or longer.

Then, predetermined amounts of a solution of an aluminum compound (basic aluminum acetate) in ethylene glycol and a solution of a phosphorus compound (Irganox 1222: a compound of the above-mentioned chemical formula (4)) in ethylene glycol were added to this esterification reaction product. The resulting mixture was continuously supplied to the first polycondensation reactor, and a polycondensation reaction was conducted with stirring at 261° C. and 6.7 kPa for 1 hour; then, at 272° C. and 0.6 kPa for 1 hour with stirring in the second polycondensation reactor; and then, at 275° C. and 0.10 to 0.20 kPa for 1.4 hour with stirring in the final polycondensation reactor. After the polycondensation reaction, the reaction product was passed through a polymer filter, and the copolymerized polyester resin in a melted state was pulled out in a strand form from a nozzle of a die, cooled with water in a cooling bath, and cut into chips. The number-average molecular weight of the resulting copolymerized polyester resin was 29,000. Result of the evaluations is shown in Table 1. The copolymerized polyester resin obtained in this Example was evaluated in view of sheet moldability by the method mentioned in 8). The moldability was good. The haze of the corrugated molded plate was 9.8, and the evaluation of thermal stability was 0.11. Therefore, the haze and the evaluation of thermal stability were slightly lowered.

Example 9

Terephthalic acid (TPA) (2414 parts by mass), ethylene glycol (EG), neopentyl glycol (NPG) and diethylene glycol (DEG) were placed in an esterification reactor of 10 L volume equipped with a stirrer and a distillation condenser. Then, a solution of antimony trioxide and cobalt acetate as a catalyst in ethylene glycol was added thereto in such an amount that the resulting copolymerized polymer resin contains 250 ppm of antimony metal and 10 ppm of cobalt metal.

After that, the reaction system was gradually heated up to the final temperature of 240° C., and an esterification reaction was conducted for 180 minutes at the pressure of 0.25 MPa. After it was confirmed that no more distilled water came from the reaction system, the reaction system was returned to the ordinary pressure. To the resulting oligomer, neopentyl glycol in an amount corresponding to 20% of the amount which was added before the esterification reaction and diethylene glycol in an amount which corresponds to the aimed composition were added and then the reaction was conducted for about 15 minute or longer. A solution of trimethyl phosphate in ethylene glycol was added thereto in such an amount that the resulting copolymerized polyester contains 50 ppm of the residual phosphorus atom.

The resulting oligomer was transferred to a polycondensation rector and the pressure was reduced together with gradual temperature rise so that the final temperature and pressure become 270° C. and 0.2 hPa, respectively. The reaction was continued until a torque value of a stirring blade corresponding to the intrinsic viscosity reached a desired value, and then the polycondensation reaction was finished. The resulting melted copolymerized polyester resin was pulled out in a strand from a pulling-out hole at a lower part of the polycondensation reactor, cooled with a water bath tank and cut into chips. The number-average molecular weight of the resulting copolymerized polymer resin was 19000. The resulting copolymerized polyester resin was subjected to a heating treatment in the same manner as in Example 1.

Result is shown in Table 1. The copolymerized polyester resin obtained in this Example was evaluated in view of sheet moldability by the method mentioned in 8). The moldability was good. There was a tendency that the haze of the corrugated molded plate and the thermal stability were a bit inferior. However, there was no problem.

Comparative Example 1

A slurry containing highly pure terephthalic acid (TPA) as a dicarboxylic acid component and ethylene glycol (EG) as a glycol component was prepared with a molar ratio (G/A) of the total glycol components to the dicarboxylic component of 2.0. This slurry was continuously supplied to a first esterification reactor wherein the reacting substances previously remain. After that, an esterification reaction was conducted with stirring under a condition wherein the pressure in the reactor was 0.17 MPa and the temperature was 255° C. so as to make the average retention time 3 hours. The resulting reaction product was transferred to a second esterification reactor, and an esterification reaction was conducted with stirring under a condition wherein the pressure in the reactor was 0.05 MPa and the temperature was 261° C. so as to make the average retention time 1 hour. The resulting esterification reaction product was transferred to a third esterification reactor, and an esterification reaction was conducted with stirring under a condition wherein the pressure in the reactor was 0.05 MPa and the temperature was 266 to 267° C. Then, predetermined amounts of a solution of an aluminum compound (basic aluminum acetate) in ethylene glycol and a solution of a phosphorus compound (Irganox 1222: a compound of the above-mentioned chemical formula (4)) in ethylene glycol were added to this esterification reaction product. The resulting mixture was continuously supplied to the first polycondensation reactor, and a polycondensation reaction was conducted with stirring at 268° C. and 4.7 kPa for 1 hour; then, at 270° C. and 0.57 kPa for 1 hour with stirring in the second polycondensation reactor; and then, at 274° C. and 0.17 kPa for 1 hour with stirring in the final polycondensation reactor. After the polycondensation reaction, the reaction product was passed through a polymer filter, and the copolymerized polyester resin in a melted state was pulled out in a strand form from a nozzle of a die, cooled with water in a cooling bath, and cut into chips. The number-average molecular weight of the resulting copolymerized polyester resin was 19,000. Result of the evaluations is shown in Table 1.

Comparative Example 2

A copolymerized polyester resin was synthesized using the same synthesis method as in Example 1 except that the amount of NPG was adjusted to 45% by mole. The resulting copolymerized polyester resin was evaluated. Since this copolymerized polyester resin contains abundant NPG, it was inferior in any of the evaluations. Result of the evaluations is shown in Table 1.

Comparative Example 3

A copolymerized polyester resin was synthesized using the same synthesis method as in Example 1 except that the amount of DEG was adjusted to 30% by mole. The resulting copolymerized polyester resin was evaluated. Since this copolymerized polyester resin contains abundant DEG, it was inferior in thermal stability. Result of the evaluations is shown in Table 1.

Comparative Example 4

A copolymerized polyester resin was synthesized using the same synthesis method as in Example 1 except that the amount of NPG was adjusted to 46% by mole and the amount of DEG was adjusted to 23% by mole. The resulting copolymerized polyester resin was evaluated. Since this copolymerized polyester resin contains abundant DEG and NPG, it was inferior in any of the evaluations. Result of the evaluations is shown in Table 1.

Comparative Example 5

A slurry containing highly pure terephthalic acid (TPA) as a dicarboxylic acid component and ethylene glycol (EG) and neopentyl glycol (NPG) as glycol components was prepared with a molar ratio (G/A) of the total glycol components to the dicarboxylic component of 2.2. This slurry was continuously supplied to a first esterification reactor wherein the reacting substances previously remain. Further, diethylene glycol in an amount which corresponds to the aimed composition was added and continuously supplied to the first esterification reactor. After that, an esterification reaction was conducted with stirring under a condition wherein the pressure in the reactor was 0.15 MPa and the temperature was 257° C. so as to make the average retention time 3 hours. The resulting reaction product was transferred to a second esterification reactor, and an esterification reaction was conducted with stirring under a condition wherein the pressure in the reactor was 0.05 MPa and the temperature was 257° C. so as to make the average retention time 1 hour. The resulting esterification reaction product was transferred to a third esterification reactor, and an esterification reaction was conducted with stirring under a condition wherein the pressure in the reactor was 0.05 MPa and the temperature was 257° C. Then, predetermined amounts of a solution of an aluminum compound (basic aluminum acetate) in ethylene glycol and a solution of a phosphorus compound (Irganox 1222: a compound of the above-mentioned chemical formula (4)) in ethylene glycol were added to this esterification reaction product. The resulting mixture was continuously supplied to the first polycondensation reactor, and a polycondensation reaction was conducted with stirring at 261° C. and 6.7 kPa for 1 hour; then, at 272° C. and 0.6 kPa for 1 hour with stirring in the second polycondensation reactor; and then, at 275° C. and 0.10 to 0.20 kPa for 1 hour with stirring in the final polycondensation reactor. After the polycondensation reaction, the reaction product was passed through a polymer filter, and the copolymerized polyester resin in a melted state was pulled out in a strand form from a nozzle of a die, cooled with water in a cooling bath, and cut into chips. The number-average molecular weight of the resulting copolymerized polyester resin was 19,000. Result of the evaluations is shown in Table 1. The copolymerized polyester resin obtained in this Comparative Example was evaluated in view of sheet moldability by the method mentioned in 8). The copolymerized polyester resin obtained in this Comparative Example was inferior compared with each of Examples.

TABLE 1

| Items | | Example 1 | Example 2 | Example 3 | Example 4 | Example 5 | Example 6 | Example 7 | Example 8 | Example 9 |
|---|---|---|---|---|---|---|---|---|---|---|
| Compositions of resins (mol %) | terephthalic acid | 100 | 100 | 100 | 100 | 100 | 100 | 100 | 100 | 100 |
| | ethylene glycol | 70 | 78 | 43 | 61 | 70 | 70 | 70 | 70 | 70 |
| | neopentyl glycol | 21 | 16 | 38 | 21 | 21 | 21 | 21 | 21 | 21 |
| | diethylene glycol | 9 | 6 | 19 | 18 | 9 | 9 | 9 | 9 | 9 |
| Cyclic oligomer | T2N1D1 | 4600 | 3900 | 4800 | 4500 | 3900 | 4000 | 4000 | 4800 | 3900 |
| | CT | 3500 | 3400 | 6800 | 3600 | 3300 | 3600 | 3400 | 6000 | 3600 |
| Physical properties of resins | number-average molecular weight | 19000 | 19000 | 18000 | 19000 | 19000 | 20000 | 16000 | 29000 | 19000 |
| | carboxyl end group concentration (AV) (eq/t) | 16 | 12 | 12 | 14 | 8 | 24 | 12 | 13 | 12 |
| | color b value | 2.3 | 2.2 | 3.0 | 3.0 | 2.3 | 4.5 | 2.5 | 2.3 | 2.3 |
| | Tg (° C.) | 71 | 73 | 72 | 72 | 72 | 72 | 72 | 72 | 72 |
| Amount of remaining metal (ppm) | aluminum | 30 | 30 | 30 | 30 | 30 | 35 | 35 | 35 | — |
| | phosphorus | 77 | 77 | 77 | 87 | 65 | 90 | 90 | 90 | 50 |
| | antimony | — | — | — | — | — | — | — | — | 250 |
| | cobalt | — | — | — | — | — | — | — | — | 10 |
| | molar ratio of phosphorus atom to aluminum atom | 2.2 | 2.2 | 2.2 | 2.5 | 1.9 | 2.2 | 2.2 | 2.2 | — |
| Evaluation of sheet-preparation property | | ⊚ | ⊚ | ○ | ⊚ | ⊚ | ⊚ | ⊚ | ○ | ⊚ |
| Haze of corrugated molded plate (%) | | 4.3 | 4.4 | 1.5 | 4.3 | 4.2 | 4.8 | 12.0 | 9.8 | 11.8 |
| DSC measurement | | ○ | ○ | ○ | ○ | ○ | ○ | ○ | ○ | ○ |
| Thermal stability | TD | 0.04 | 0.04 | 0.06 | 0.06 | 0.04 | 0.11 | 0.04 | 0.11 | 0.11 |

| Items | | Comparative Example 1 | Comparative Example 2 | Comparative Example 3 | Comparative Example 4 | Comparative Example 5 |
|---|---|---|---|---|---|---|
| Compositions of resins (mol %) | terephthalic acid | 100 | 100 | 100 | 100 | 100 |
| | ethylene glycol | 98 | 45 | 50 | 31 | 65 |
| | neopentyl glycol | — | 45 | 20 | 46 | 25 |
| | diethylene glycol | 2 | 10 | 30 | 23 | 10 |
| Cyclic oligomer | T2N1D1 | — | 5200 | 4600 | 7800 | 5200 |
| | CT | 10080 | 7200 | 2500 | 1800 | 4000 |

TABLE 1-continued

| | | | | | | |
|---|---|---|---|---|---|---|
| Physical properties of resins | number-average molecular weight | 19000 | 19000 | 19000 | 19000 | 19000 |
| | carboxyl end group concentration (AV) (eq/t) | 12 | 15 | 19 | 10 | 17 |
| | color b value | 1.9 | 3.3 | 6.0 | 3.9 | 2.5 |
| | Tg (° C.) | 72 | 72 | 30 | 72 | 70 |
| Amount of remaining metal (ppm) | aluminum | 30 | 30 | 30 | 30 | 30 |
| | phosphorus | 77 | 77 | 77 | 77 | 77 |
| | antimony | — | — | — | — | — |
| | cobalt | — | — | — | — | — |
| | molar ratio of phosphorus atom to aluminum atom | 2.2 | 2.2 | 2.2 | 2.2 | 2.2 |
| Evaluation of sheet-preparation property | | x | x | ○ | x | Δ |
| Haze of corrugated molded plate (%) | | 30.0 | 16.0 | 4.6 | 16.5 | 11.0 |
| DSC measurement | | x | ○ | ○ | ○ | ○ |
| Thermal stability | TD | 0.01 | 0.11 | 0.19 | 0.15 | 0.04 |

INDUSTRIAL APPLICABILITY

The copolymerized polyester resin of the present invention is excellent in terms of transparency, color tone and moldability and, further, exhibits less stain of the molding die and less foreign matter adhesion to the molded product and film. Accordingly, the copolymerized polyester resin of the present invention is excellent in economic efficiency and can give a molded product having high commercial value whereby it greatly contributes in industrial world.

The invention claimed is:

1. A copolymerized polyester resin which contains
   (a) terephthalic acid, wherein terephthalic acid is the most abundant dicarboxylic acid component on a % by mole basis,
   (b) ethylene glycol, wherein ethylene glycol is the most abundant diol component on a % by mole basis,
   (c) neopentyl glycol in an amount of more than 15% by mole and not more than 40% by mole when a total amount of the whole diol component is taken as 100% by mole, and
   (d) diethylene glycol in an amount of from 6 to 20% by mole when a total amount of the whole diol component is taken as 100% by mole,
   wherein a content of a cyclic dimer consisting of terephthalic acid, neopentyl glycol, and diethylene glycol is 1000 ppm or more and 5000 ppm or less, and
   wherein a content of a cyclic trimer consisting of terephthalic acid and ethylene glycol is 1000 ppm or more and 5000 ppm or less.

2. The copolymerized polyester resin according to claim 1, wherein the content of cyclic trimer consisting of terephthalic acid and ethylene glycol is 1000 ppm or more and 4000 ppm or less.

3. The copolymerized polyester resin according to claim 1, wherein the copolymerized polyester resin has a color b value of from −5.0 to 10.0.

4. The copolymerized polyester resin according to claim 1, wherein the copolymerized polyester resin has a carboxyl end group concentration (AV) of from 8 to 25 eq/t, wherein the copolymerized polyester resin contains aluminum atom and phosphorus atom, wherein a content of the aluminum atom in the copolymerized polyester resin is 15 to 40 ppm and wherein a molar ratio of the phosphorus atom to the aluminum atom in the copolymerized polyester resin is 1.8 to 2.6.

5. The copolymerized polyester resin according to claim 1, wherein, when a corrugated molded plate is prepared by molding the copolymerized polyester resin and a haze value is measured on an area of the corrugated molded plate having a thickness of 5 mm, the haze value is 15% or less.

6. A molded product comprising the copolymerized polyester resin according to claim 1.

7. A heat-shrinkable film comprising the copolymerized polyester resin according to claim 1.

8. The copolymerized polyester resin according to claim 2, wherein the copolymerized polyester resin has a color b value of from −5.0 to 10.0.

9. The copolymerized polyester resin according to claim 8, wherein the copolymerized polyester resin has a carboxyl end group concentration (AV) of from 8 to 25 eq/t, wherein the copolymerized polyester resin contains aluminum atom and phosphorus atom, wherein a content of the aluminum atom in the copolymerized polyester resin is 15 to 40 ppm and wherein a molar ratio of the phosphorus atom to the aluminum atom in the copolymerized polyester resin is 1.8 to 2.6.

10. The copolymerized polyester resin according to claim 9, wherein, when a corrugated molded plate is prepared by molding the copolymerized polyester resin and a haze value is measured on an area of the corrugated molded plate having a thickness of 5 mm, the haze value is 15% or less.

11. A molded product comprising the copolymerized polyester resin according to claim 10.

12. A heat-shrinkable film comprising the copolymerized polyester resin mentioned in claim 10.

* * * * *